March 24, 1931. F. A. APGAR 1,797,255
ART OF REFINING HYDROCARBONS
Filed Sept. 14, 1928
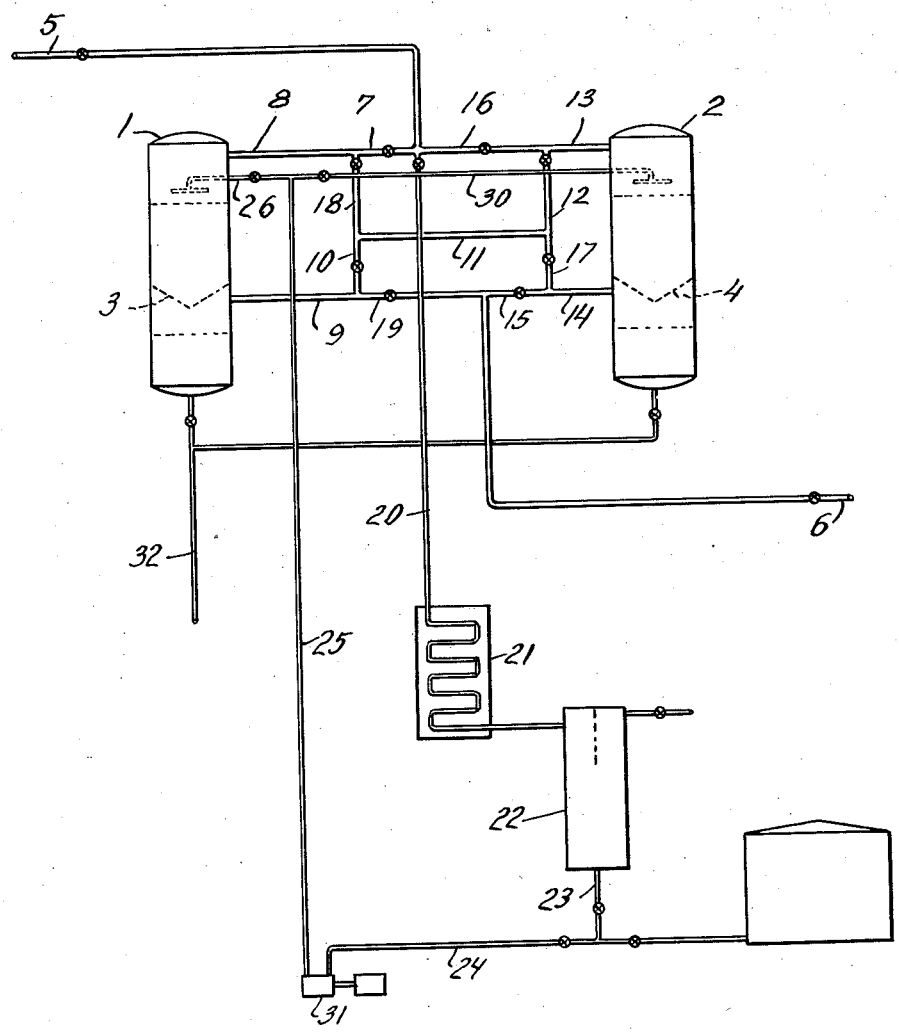
INVENTOR
Frank A. Apgar
BY
ATTORNEYS Patented Mar. 24, 1931

1,797,255

UNITED STATES PATENT OFFICE

FRANK A. APGAR, OF HAMMOND, INDIANA, ASSIGNOR TO SINCLAIR REFINING COMPANY, OF NEW YORK, N. Y., A CORPORATION OF MAINE

ART OF REFINING HYDROCARBONS

Application filed September 14, 1928. Serial No. 305,879.

This invention relates to improvements in the vapor phase refining of hydrocarbons by passage of the hydrocarbon vapors through an adsorptive catalyst, such as fuller's earth, to separate therefrom unstable unsaturated constituents unsuitable as components of the desired product. When hydrocarbon vapors are passed through fuller's earth, for example, certain types of unsaturated constituents, such as the di-olefines, are polymerized to form polymers higher boiling than the original constituents which polymers can then be separated from the vapors, for example, by fractional condensation. This general type of refining operation is well known, and is of special value as applied to the refining of gasoline, particularly cracked gasoline, intended for use as motor fuel for removal of unstable constituents or constituents of bad color or bad odor without removal of unsaturated constituents having anti-knock properties.

As generally practiced, this general method has involved charging of a suitable receptacle with a batch of the adsorptive catalyst, passing the hydrocarbon vapors through this receptacle in contact with the adsorptive catalyst until the catalyst has lost its effectiveness, discharging the spent adsorptive catalyst, replacing the discharged adsorptive catalyst with a fresh charge of the adsorptive catalyst, and so on. The period of operation is thus limited to that period over which the adsorptive catalyst remains sufficiently active to effect the required refining treatment. The adsorptive catalysts commonly used, fuller's earth for example, moreover assume an apparent state of inactivity before the catalyst itself actually becomes ineffective by choking with high boiling polymers produced by the vapor-catalyst contact. This difficulty is particularly acute where the vapors to be treated contain a large proportion of material polymerizing on contact with the adsorptive catalyst, in the treatment of raw cracked gasoline from vapor phase cracking operations in which severe cracking conditions are maintained, for example. The period of operation is thus further limited.

This invention provides an improved method of carrying out such vapor phase refining operations which materially prolongs the useful life of the adsorptive catalyst used in the refining operation, which prolongs the useful period of operation and which has several further advantages.

According to the present invention, the hydrocarbon vapors to be refined are passed successively through two charges of the adsorptive catalyst and the sequence in which the vapors pass through these two charges of the adsorptive catalyst is periodically reversed as the operation continues. The major part of the polymerization of undesirable constituents is effected as the vapors pass through the first charge of catalyst and the polymerization of such undesirable constituents is completed as the vapors pass through the second charge of catalyst. When the sequence of contact between the vapors and the two charges of catalyst is reversed, the initial vapor-catalyst contact is effected with respect to a charge of catalyst of reduced activity, inhibiting any losses due to over-treatment through excessive activity of the catalyst first contacting with the vapors, and in passing through the second charge of catalyst the vapors effect a separation of polymerized material therefrom, apparently by a sort of washing action, at the same time that the polymerization is being completed. This separation of polymerized material is promoted by maintaining downflow of vapors through this charge of catalyst. The sequence of contact between the vapors and the charges of catalyst is reversed as soon as the activity of the charge of catalyst through which the vapors last pass is sufficiently renewed and before the activity of the charge of catalyst through which the vapors first pass is exhausted. In this way, the useful life of the adsorptive catalyst can usually be doubled or trebled and sometimes multiplied ten-fold or more. This improvement in the useful life of the adsorptive catalyst is important not only because of the expense of supplying or revivifying the catalyst but also because of the expense involved in handling the catalyst and the loss of operating time involved in replacing spent catalyst with fresh catalyst.

The invention will be further described in connection with the accompanying drawings which illustrate, diagrammatically and conventionally, in elevation, apparatus adapted for carrying out the invention, but it is intended and will be understood that this more detailed description and illustration of the invention is by way of exemplification.

Referring to the drawings, the refining operation is carried out in two towers 1 and 2 in which charges of adsorptive catalyst, for example, fuller's earth of 40–60 and 60–80 mesh, are supported upon foraminous partitions 3 and 4. The hydrocarbon vapors to be refined are supplied through connection 5 and the refined hydrocarbon vapors are discharged through connection 6 to a condensing or fractionating system of conventional construction and operation. In operation the unrefined hydrocarbon vapors are passed successively through one and then the other of the refining towers 1 and 2 for a period of time, and then through these towers in the reverse direction for a similar period of time, and so on. For example, the raw hydrocarbon vapors are passed from connection 5 through connections 7 and 8 downwardly through tower 1 through connections 9, 10, 11, 12 and 13 downwardly through tower 2 and through connections 14 and 15 to connection 6 for one hour and then passed from connection 5 through connections 16 and 13 downwardly through tower 2 through connections 14, 17, 11, 18 and 8 downwardly through tower 1 and through connections 9 and 19 to connection 6 for an hour, then successively through tower 1 and tower 2 as first described for an hour, and so on. The high boiling material separated in the refining towers 1 and 2 and condensed from the vapors therein is discharged through connection 32.

While the reversal of flow through the two towers 1 and 2 is being effected, the unrefined vapors are passed from connection 5 through connection 20 to condenser 21 from which the resulting condensate is discharged into receiver 22. As soon as the reversal has been effected, this condensate collecting in the interim is introduced through connections 23, 24, 25 and 26 or 30 by means of pump 31 into the tower 1 or 2 through which the vapors last pass at that time. For example, if the vapors are passing downwardly through tower 1 and then downwardly through tower 2 this condensate is introduced into tower 2 through connection 30.

The period between reversals of sequence of the contact between the vapors and the charges of the adsorptive catalyst will vary with the operating conditions and with the character of the vapors to be refined. If the vapors to be refined contain a relatively large proportion of constituents polymerizing on contact with the adsorptive catalyst or if the operation is carried out at relatively high temperatures inducing polymerization, this period may be relatively short, and vice versa. In any case, this period should not be so long that the charge of catalyst with which the vapors first contact becomes exhausted before reversal.

The invention is of special value and application in the treatment of raw cracked gasoline from vapor phase cracking operations in which severe cracking conditions are maintained. Such raw gasoline frequently contains unsaturated constituents polymerizing on contact with the adsorptive catalyst in amounts so large that the proportion of polymers produced is as much as 10–11% by liquid volume of the gasoline product after separation of such polymers. The present invention makes it practical to apply this general type of refining operation to such highly reactive products notwithstanding the unusually large amount of polymers produced by the vapor-catalyst contact.

I claim:

1. In the vapor phase refining of hydrocarbons by passage of the hydrocarbon vapors through an adsorptive catalyst, the improvement which comprises passing the hydrocarbon vapors to be refined successively through two separate bodies of the adsorptive catalyst and before complete deactivation of the then first body periodically reversing the sequence in which the vapors pass through the said two separate bodies of catalyst as the operation continues.

2. In the vapor phase refining of hydrocarbons by passage of the hydrocarbon vapors through an adsorptive catalyst, the improvement which comprises passing the hydrocarbon vapors to be refined successively through two separate bodies of the adsorptive catalyst and before complete deactivation of the then first body periodically reversing the sequence in which the vapors pass through the said two charges of catalyst as the operation continues while maintaining down-flow of vapors through the body of catalyst through which the vapors last pass.

3. In the vapor phase refining of hydrocarbons by passage of the hydrocarbon vapors through an adsorptive catalyst, the improvement which comprises passing the hydrocarbon vapors to be refined successively through two separate bodies of the adsorptive catalyst and before complete deactivation of the then first body periodically reversing the sequence in which the vapors pass through the the said two charges of catalyst as the operation continues, condensing the hydrocarbon vapors to be refined during reversal and after reversal introducing this condensate into the body of catalyst through which the vapors then last pass.

In testimony whereof I affix my signature.

FRANK A. APGAR.